United States Patent [19]

Fujino et al.

[11] 3,853,837

[45] Dec. 10, 1974

[54] NOVEL NONAPEPTIDE AMIDE ANALOGS OF LUTEINIZING HORMONE RELEASING FACTOR

[75] Inventors: Masahiko Fujino, Takarazuka; Shigeru Kobayashi, Osaka; Mikihiko Obayashi, Osaka; Susumu Shinagawa, Osaka; Tsunehiko Fukuda, Osaka, all of Japan

[73] Assignee: Takeda Chemical Industries, Ltd., Osaka, Japan

[22] Filed: Apr. 25, 1973

[21] Appl. No.: 354,381

[30] Foreign Application Priority Data
Apr. 29, 1972 Japan.............................. 47-42686
Nov. 24, 1972 Japan............................. 47-118452

[52] U.S. Cl. ............................. 260/112.5, 424/177
[51] Int. Cl...................... C07c 103/52, A61k 27/00
[58] Field of Search ................................ 260/112.5

[56] References Cited
OTHER PUBLICATIONS
Fujiro et al., Biochem. Biophys. Res. Comm., 49, 698–705 (1972).

Coy et al., J. Med. Chem., 16, 83–84, (1973).

*Primary Examiner*—Lewis Gotts
*Assistant Examiner*—Reginald J. Suyat
*Attorney, Agent, or Firm*—Wenderoth, Lind & Ponack

[57] ABSTRACT

The present invention relates to nonapeptide amide derivatives of the formula:

L-pyroglutamyl-L-histidyl-L-tryptophyl-L-seryl-$A_1$-glycyl-$A_2$-L-arginyl-L-prolyl-Y (wherein $A_1$ is L-tyrosyl or L-phenylalanyl; $A_2$ is L-leucyl, L-isoleucyl, L-norleucyl, L-valyl, L-norvalyl, L-methionyl or L-phenylalanyl, Y represents NHR in which R is a straight or branched alkyl group of one to three carbon atoms which may be substituted by hydroxy or alternatively Y represents pyrrolidino), and pharmaceutically acceptable salt thereof. The subject peptides have strong ovulation inducing activity.

13 Claims, No Drawings

NOVEL NONAPEPTIDE AMIDE ANALOGS OF LUTEINIZING HORMONE RELEASING FACTOR

The present invention relates to novel nonapeptide amide derivatives which have potent ovulation inducing activity.

In particular, the present invention relates to novel nonapeptide amide derivatives shown by the general formula (I):

H—(Pyr)Glu—His—Trp—Ser—$A_1$—Gly—$A_2$—Arg—Pro—Y  (I)

(wherein $A_1$ represents Tyr or Phe; $A_2$ is Leu, ILe, NLe, Val, NVal, Met or Phe; Y represents NHR in which R is a straight or branched alkyl group of one to three carbon atoms which may be substituted by hydroxy or alternatively Y represents pyrrolidino) and pharmaceutically acceptable salts thereof. The present invention relates also to a method for the nonapeptide amide derivatives or its pharmaceutically acceptable salts thereof.

Throughout the specification, (Pyr)Glu, His, Trp, Ser, Tyr, Phe, Gly, Leu, ILe, NLe, Val, NVal, Met, Arg and Pro represent "residues" of L-pyroglutamic acid, L-histidine, L-tryptophane, L-serine, L-tyrosine, L-phenylalanine, glycine, L-leucine, L-isoleucine, L-norleucine, L-valine, L-norvaline, L-methionine, L-arginine and L-proline, respectively. By the "residue" is meant a radical derived from the corresponding α-amino acid by eliminating the OH portion of the carboxyl group and the H portion of the α-amino group. Thus in the case of L-arginine

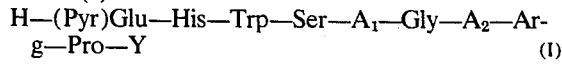

for example, which may be represented by the formula $NH_2$—A—COOH ($NH_2$ is the α-amino radical), the radical (—NH—A—CO—) represents a "residue" of L-arginine and is abbreviated as "—Arg—." Abbreviations for the other α-amino acids mentioned above have the similar meaning as the illustration just given for L-arginine.

Referring to the above substituent R, the straight or branched alkyl group of one to three carbon atoms which may be substituted by hydroxy is exemplified by methyl, ethyl, n-propyl, i-propyl, hydroxy-methyl, 1-hydroxyethyl, 2-hydroxyethyl, 2-hydroxy-n-propyl, 3-hydroxy-n-propyl, 2,2-dihydroxy-i-propyl or the like.

It was known for many years that the hypothalamus contains factors which, at a higher level, control the secretion of tropic hormones from the pituitary. Recently, subsequent to the isolation of a thyrotropin-releasing hormone (TRH), a hormone which promotes the secretion of luteinizing hormone has been extracted in pure form from pigs and sheep and shown to be a decapeptide of the structure: H—(Pyr)Glu—His—Trp—Ser—Tyr—Gly—Leu—Arg—Pro—Gly—$NH_2$. [A. V. Schally et al. Biochem. Biophys. Res. Commun., 43, 1334 (1971): R. Guillemin et al, Proc. Nat. Acad. Sci., U.S.A., 69, 278(1972)]. This finding has been followed by the synthesis of a number of similar peptides and biological tests have also been performed on these analogous peptides. However, even a minor modification in the above amino acid composition diminishes seriously the physiological activity of the peptide and the above chemical structure has been considered to be essential to the genesis of maximal physiological activity. [A. V. Schally et al, Biochem. Biophys. Res. Commun., 4, 366(1972)].

Under the circumstances, the present inventors have succeeded in synthesizing nonapeptide amide derivatives (I) as well as their pharmaceutically acceptable salts and have surprisingly found that these compounds have more potent ovulation inducing activity than the naturally occurring decapeptide. It has been also found by the present inventors that those compounds act upon the pituitary to promote the secretion of both lutenizing hormone and follicle-stimulating hormone. The present inventors further have found that those compounds are useful not only as drugs for human beings, e.g. drugs for diagnosis of the pituitary function or the gonadotropin deficiency and therapy of amenorrhea, but also as veterinary drugs particularly for the purpose of the animal breeding. The present invention is the culmination of those unexpected findings.

Therefore, it is the main object of the present invention to provide novel nonapeptide amide derivatives and pharmaceutically acceptable salts thereof which have strong ovulation inducing activity.

Another object of the present invention is to provide a method for the production of the nonapeptide amide derivatives (I) and pharmaceutically acceptable salts thereof.

Further objects of the present invention will be made clear in accordance with the description mentioned hereinafter in this specification.

The nonapeptide amide derivative of the general formula (I) or pharmaceutically acceptable salt thereof is produced by a method characterized by that a reagent (A) — L-pyroglutamic acid or a peptide fragment which has a L-pyroglutamic acid unit (i.e., H—(Pyr)-Glu—) at its N-terminal end and at the same time which, from thereon, comprises the above amino acid sequence — is condensed with a reagent (B) — an amine component which corresponds to the balance of the above product nonapeptide amide derivative (I) —, said two reagents (A) and (B) being optionally protected by protecting group or groups, and then the protecting group or groups if any are removed.

Thus, the reagent (A) is L-pyroglutamic acid or a peptide fragment which has a L-pyroglutamic acid unit at its N-terminal end and at the same time which from thereon comprises amino acid sequence shown by the general formula (I), and the reagent (B) to be condensed with the reagent (A) is an amine component which corresponds to the balance of the above product nonapeptide amide derivative (I), the reagents (A) and (B) being optionally protected.

Therefore, the relationship of the reagent (A) relative to the reagent (B) is shown as follows.

| Method No. | Reagent (A) | Reagent (B) |
|---|---|---|
| 1 | H-(Pyr)Glu-OH | H-His-Trp-Ser-$A_1$-Gly-$A_2$-Arg-Pro-Y |
| 2 | H-(Pyr)Glu-His-OH | H-Trp-Ser-$A_1$-Gly-$A_2$-Arg-Pro-Y |
| 3 | H-(Pyr)Glu-His-Trp-OH | H-Ser-$A_1$-Gly-$A_2$-Arg-Pro-Y |
| 4 | H-(Pyr)Glu-His-Trp-Ser-OH | H-$A_1$-Gly-$A_2$-Arg-Pro-Y |

-Continued

| Method No. | Reagent (A) | Reagent (B) |
|---|---|---|
| 5 | H-(Pyr)Glu-His-Trp-Ser-A₁-OH | H-Gly-A₂-Arg-Pro-Y |
| 6 | H-(Pyr)Glu-His-Trp-Ser-A₁-Gly-OH | H-A₂-Arg-Pro-Y |
| 7 | H-(Pyr)Glu-His-Trp-Ser-A₁-Gly-A₂-OH | H-Arg-Pro-Y |
| 8 | H-(Pyr)Glu-His-Trp-Ser-A₁-Gly-A₂-Arg-OH | H-Pro-Y |
| 9 | H-(Pyr)Glu-His-Trp-Ser-A₁-Gly-A₂-Arg-Pro-OH | H-Y |

When a compound of the left column is employed as the reagent (A), the compound of the right column on the same line is employed as the reagent (B), which is the counterpart compound of the reagent (A) in the condensation reaction. The reagents (A) and/or (B) may be protected prior to the condensation reaction or activated in the condensation reaction, more precisely prior to the peptide bond formation reaction, as described below.

Among those skilled in the peptide synthesis, there has hitherto been well known that all kinds of peptides can be produced by condensing an amino acid or a fragmental peptide (i.e., a peptide of a smaller units) with an amino acid or a fragmental peptide (i.e., a peptide of a smaller units). A number of procedures or techniques for the condensation reaction have hitherto been well established.

For example, the functional group or groups (e.g. amino group, carboxy group, hydroxy group, guanidino group) which are not involved in the peptide bond (i.e., —CONH—) formation reaction through the condensation reaction may be protected by the protecting group or groups prior to the condensation reaction. In the method of the present invention also, the reagent (A) or (B) may be protected in respect of the functional group or groups which do not take part in the condensation reaction in accordance with per se known procedures.

It has been well known that, prior to the peptide bond formation reaction, the C-terminal carboxyl group or the N-terminal amino group of an amino acid or a fragmental peptide which is involved in the peptide bond formation reaction is activated for enabling it to bring about the peptide bond formation, and that if not activated the peptide bond formation reaction is carried out in the presence of a dehydrating agent. Procedures for the activation of the C-terminal carboxyl group as well as the N-terminal amino group have been well established. The method of the present invention may utilize a per se well known prior art. That is to say, the condensation of the present invention may be carried out by the first step of activating the C-terminal carboxyl group of the reagent (A) or activating the N-terminal amino group of the reagent (B) and the second step of the peptide bond formation reaction between the activated reagent (A) and the reagent (B) or between the reagent (A) and the activated reagent (B) or alternatively carried out by the peptide bond formation reaction between the reagent (A) and reagent (B) in the presence of a dehydrating agent, the reagents (A) and (B) being optionally protected.

Further, it has been known that when the above mentioned functional group or groups are protected by the protecting group or groups prior to the condensation reaction the protecting group or groups are removed after the condensation reaction. In the method of the present invention also, the removal of the protection may be carried out in accordance with the prior art.

In this connection, it has also been known that a protected L-glutamyl group shown by the general formula (II):

$$RCO—CH_2CH_2CH(NH_2)CO— \qquad (II)$$

(wherein R is an alkoxy group (e.g. methoxy, ethoxy, n-propoxy, i-propoxy, n-butoxy, etc.), an aralkyloxy group (e..g. benzyloxy, etc.) or amino) is easily converted to the L-pyroglutramyl group itself:

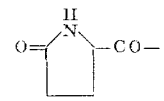

by the contact with a base (e.g. ammonia, etc.) or an acid (e.g. acetic acid etc.) and that the group (II) is equivalent to L-pyroglutamyl group itself in this respect. In the method of the present invention, it is to be construed that the L-pyroglutamyl (i.e., H—(Pyr)-Glu—) of the reagent (A) includes not only the L-pyroglutamyl group itself but also the protected L-glutamyl group of the formula (II). In case when H—(-Pyr)Glu— of the reagent (A) represents the group (II), the group (II) is easily converted to L-pyroglutamyl group itself in accordance with per se known means.

Below given are some of the procedures that may advantageously employed in working the peptide bond formation reaction of the present invention.

i. The procedure in which protected or unprotected reagent (A), whose C-terminal carboxyl group is a free carboxyl, is reacted with protected or unprotected reagent (B) whose N-terminal amino group is a free amino in the presence of a condensing agent.

ii. The procedure in which protected or unprotected reagent (A), the C-terminal carboxyl group of which has been activated is reacted with the reagent (B) whose N-terminal amino group is a free amino.

iii. The procedure in which protected or unprotected reagent (A), the C-terminal carboxyl group of which is a free carboxyl, is reacted with protected or unprotected reagent (B) whose N-terminal amino group has been activated.

Thus, a protecting group for the intramolecular acyl-amino group of L-pyroglutamic acid includes benzyloxycarbonyl, t-butoxycarbonyl, isobornyloxycarbonyl, etc.; a protecting group for the imino group of L-histidine includes benzyl, tosyl, 2,4-dinitrophenyl, t-butoxycarbonyl, carbobenzoxy, etc.; protecting group for the hydroxyl group of L-serine includes such ether-forming groups as benzyl, t-butyl, etc.; a protecting group for the hydroxyl group of tyrosine includes such ether-forming groups as benzyl, t-butyl, etc.; a protecting group for the guanidino group of L-arginine includes nitro, tosyl, carbobenzoxy, isobornyloxycarbonyl, adamantyloxycarbonyl, etc. Further, the guanidino group of L-arginine may be protected through a salt formation with a proton which is derived from an acid (e.g. hydrochloric acid, hydrobromic acid, etc.) and it is to be understood that the proton is included in the protecting group of the present specification and claims.

The activated form of the C-terminal carboxyl group of the reagent (A) is exemplified by the corresponding acid anhydride, such as the mixed anhydride with a carbonic acid mono-alkyl ester; azide; and active ester (e.g. the corresponding ester of alcohol such as pentachlorophenol, 2,4,5-trichlorophenol, 2,4-dinitrophenol, cyanomethylalcohol, P-nitrophenol, N-hydroxysuccinimide, N-hydroxy-5-norbornene-2,3-dicarboximide, N-hydroxy-phthalimide, N-hydroxybenztriazole, etc.). Among those esters, N-hydroxy-5-norbornene-2,3-dicarboximide ester is preferred. Though the N-hydroxy-5-norbornene-2,3-dicarboximide ester of amino acids or peptides are novel, they can be prepared in accordance with the same manner as in the preparation of N-hydroxysuccinimide esters of amino acids or peptides.

The corresponding phosphorous acid amide is exemplified as an activated form of the N-terminal amino group of the protected or unprotected reagent (B).

As to the dehydrating agent, one may employ any reagent of the sort that can be used in peptide synthesis. For example, the so-called carbodiimide reagents, such as dicyclohexylcarbodiimide, are particularly preferred.

In conducting the condensation reaction of the method of the present invention, one may of course charge a single reactor with (1) the protected or unprotected reagent (A) whose C-terminal carboxyl group is free, (2) the protected or unprotected reagent (B) whose N-terminal amino group is free, (3) the above mentioned alcohol (e.g. N-hydroxy-5-norbornene-2,3-dicarboximide, N-hydroxysuccinimide, etc.) and (4) the dehydrating agent. In this case also, firstly the protected or unprotected reagent (A) whose C-terminal carboxyl group is free reacts with the alcohol by the aid of the dehydrating agent to produce the protected or unprotected reagent (A) whose C-terminal carboxyl group is activated, and then the protected or unprotected reagent (A) whose C-terminal carboxyl group has been activated reacts with the protected or unprotected reagent (B) whose N-terminal amino group is free. In this process, the activation of the C-terminal carboxyl group and the peptide bond formation reaction are conducted in one shot process.

Thus, to manufacture the above product peptides, one has a choise of varieties of combinations of the procedures A preferred embodiment of the method of the present invention is chematically illustrated below.

(I)

H-(Pyr)Glu-His-Trp-Ser-A₁-Gly-OH (Reagent (A)) + DCC + HONBI

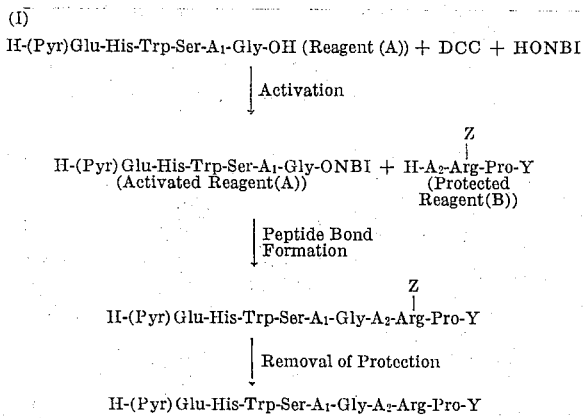

(II)

H-(Pyr)Glu-His-Trp-Ser-A₁-Gly-OH
(Reagent(A))

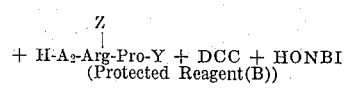

+ H-A₂-Arg-Pro-Y + DCC + HONBI
(Protected Reagent(B))

① Activation
② Peptide Bond Formation

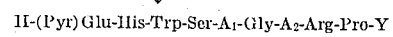

H-(Pyr)Glu-His-Trp-Ser-A₁-Gly-A₂-Arg-Pro-Y

| Removal of Protection

H-(Pyr)Glu-His-Trp-Ser-A₁-Gly-A₂-Arg-Pro-Y

In the above, DCC is N,N'-dicyclohexylcarbodiimide, HONBI is N-hydroxy-5-norbornene-2,3-dicarboximide, and Z is a protecting group of the guanidino group of the L-arginine residue.

The peptide bond formation reaction such as the above mentioned (i), (ii) or (iii) is generally conducted in a suitable solvent. The solvent is exemplified by dry or aqueous dimethylformamide, dimethylsulfoxide, pyridine, chloroform, dioxane, dichloromethane, tetrahydrofuran, etc. and mixtures of such solvents.

While the reaction temperature is usually in the range of about −20° C to about 30° C, the reaction may be conducted at still lower temperatures or under heating.

The two starting materials which are to form an peptide bond are usually employed in equimolar amoounts, though other ratios may be used if desired. Generally speaking, for each mole equivalent of one starting material, usually about 1 to 2 mole equivalents and, preferably, about 1 to 1.4 mole equivalents, of the mating (i.e., counterpart) material is employed. The proportion of the dehydrating agent is usually about 1 to 2 mole equivalents, relative to water eliminated by the peptide bond formation reaction.

Satisfactory results are obtained in many instances when the reaction time is in the range of about 6 to about 10 hours.

After the peptide bond formation reaction has been completed, the reaction product can be isolated for example by precipitating it with a solvent (in which the product compound is hardly soluble) and, then, recovering the resulting precipitate by filtration.

When the reagent (A) and/or the reagent (B) are protected by the protecting group or groups, the condensation product usually has the protecting group or groups in its molecule. However, as above mentioned, the protecting group or groups are removed by conventional procedure which will not disturb the amino acid sequence of the product nonapeptide amide derivative, and the removal of the protection leaves the nonapeptide amide derivative (I) which is free from the protecting group or groups.

Such a conventional procedure is exemplified by the catalytic reduction with such a catalyst as palladium black, palladium-on-carbon or platinum; acid hydrolysis with for example, hydrogen fluoride or trifluoroacetic acid; and chemical reduction for example with sodium metal in liquid ammonia. After any of those procedures, the desired compound can be isolated by means which are conventional per se. Among them is the precipitation procedure described above.

The end product thus isolated may be purified by a suitable procedure such as column-chromatography on, for example, carboxymethyl-cellulose, commercially available polymers for purification such as Sephadex or Amberlit XAD-2.

Depending upon the reaction conditions used, the above desired compound is obtained in the form of a base or as a salt including pharmaceutically acceptable salt. From the salt one may prepare the base by conventional procedures and the base may be converted to salts by reacting it with acids which are suitable for the manufacture of pharmaceutically acceptable salts. Among such acids are several inorganic acids such as hydrohalogenic acids, e.g. hydrochloric acid, hydrobromic acid, perchloric acid, etc., nitric acid, thiocyanic acid, sulfuric acid, phosphoric acid, etc. and several organic acids such as formic acid, acetic acid, propionic acid, glycolic acid, lactic acid, piruvic acid, oxalic acid, malonic acid, succinic acid, maleic acid, fumaric acid, anthranylic acid, cinnamic acid, naphthalenesulfonic acid, sulfanylic acid, etc.

The end compound obtained in the above-described manner can be converted to metal complex salt compounds by procedures which are conventional per se. For example, one may react an aqueous solution of the nonapeptide amide derivative obtained in the above manner with the salt, hydroxide or oxide of one or more members of zinc, nickel, cobalt, copper and ion and, then, adjust the reaction mixture to pH about 6 to 8, whereupon a slightly soluble adsorption complex salt compound between the metal compound support and the particular nonapeptide amide derivative is obtained.

It appears that of the various metal complex salt compounds thus obtainable, the zinc complex salt compounds are the most desirable from the standpoint of their sustained activity when administered.

Because of its extremely low toxicity, the nonapeptide amide derivative or pharmaceutically acceptable salt thereof prepared as above can be safely administered, whereby the compound shows strong ovulation inducing activity.

When rats are dosed with a minute amount (e.g., 50 to 500 mg./100g.) of the nonapeptide amide derivative (I) or pharmaceutically acceptable salt thereof by the intravenous, intramuscular or subcutaneous route, steep increases are observed in the lutenizing hormone and follicle-stimulating hormone concentration of the blood; when rats are infused with 10 to 200 ng./100g. of the compound by the intravenous or intramuscular route, ovulation is induced in about 50 percent of the rats; and when rats are infused with 0.1 to 5 $\mu$g./100g. of the compound by the intravenous or intramuscular route, the ovulation is induced in 100 percent of the rats tested, even if rats are in diestrus. The dosage being held constant, intravenous infusion is generally twice as effective as subcutaneous infusion. In specification "ng." is intended to mean "nanogram(s)."

The foregoing facts indicate that the peptides of this invention have more potent hormonal activities than naturally-occurring lutenizing hormone releasing hormone.

Injections can be prepared by dissolving the objective compounds according to this invention in physiological saline.

Since these compounds exhibit physiologically sufficient activities even when used in highly minute amounts, it is convenient to use them as lyophilized ampoule preparations containing manitol as an excipient.

The examples given hereinafter will further illustrate this invention. In those examples, the following abbreviations are used.

Z—: benzyloxycarbonyl; IBOC—: isobornyloxycarbonyl; BOC—: t-butyloxycarbonyl; —OEt: ethyl ester —OSU: N-hydroxysuccinimide ester; —OtBu: t-butyl ester; —ONDP: 2,4-dinitrophenol ester; —ONBI: N-hydroxy-5-norbornene-1,3-dicarboxiimide ester; —OEt: ethyl ester; HONBI: N-hydroxy-5-norbornene-2,3-dicarboximide;

DCC: N,N'-dicyclohexylcarbodiimide; DMF: N,N-dimethylformamide; TLC: thin layer chromatography; DCHA: dicyclohexylamine; MeOH: methanol; EtOH: ethanol; n-BuOH: n-butanol.

In the thin layer chromatography, the following developing solvent systems are used.

Rf 1 = Chloroform-methanol-acetic acid (9:1:0.05)

Rf 2 = Ethyl acetate-pyridine-acetic acid-water (60:20:6:11)

Rf 3 = n-Butanol-ethyl acetate-acetic acid-water (1:1:1:1)

Rf 4 = n-Butanol-acetic acid-water (4:1:1)

Rf 5 = n-Butanol-pyridine-acetic acid-water (30:20:6:24)

In those examples, the "part(s) by weight" have the same relationship to "the part(s) by volume" as do "gram(s)" to "milliter(s)," and "percent" is calculated on the weight basis unless otherwise noted, and "Amberlite CG-400 (tertiaryamine-styrene-divinylbenzene copolymer distributed by Lohm & Haas Co., U.S.A.)," "Sephadex LH-20 (esterified dextran gel distributed by Pharmacia Fine Chemicals, Sweden)," "Amberlite X-AD-2(macroleticular-sytrene-divinylbenzene copolymer distributed by Lohm & Haas Co., U.S.A.)" and "Amberlite IRA-400(tertiaryamine-styrene-divinylbenzene copolymer distributed by Lohm & Haas Co., U.S.A.)" are simply abbreviated as "Amberlite CG-400," "Sephadex LH-20," "Amberlite XAD-2" and "Amberlite IRA-400," respectively.

EXAMPLE 1

Production of H—(Pyr)Glu—His—Trp—Ser—Tyr—Gly—Leu—Arg—Pro—NHC$_2$H$_5$ a. Preparation of Z—Arg(NO$_2$)—Pro—NHC$_2$H$_5$ In 10 parts by volume of DMF are dissolved 0.901 part by weight of Z—Arg(NO$_2$)—Pro—OH and 0.181 part by weight of ethylamine hydrochloride and, under cooling at 0° C, 0.38 part by volume of triethylamine is added dropwise. Then, 0.43 part by weight of HONBI and 0.495 part by weight of DCC are added and the mixture is stirred at 0° C for 5 hours and, then, at room temperature for 10 hours. The byproduct urea is filtered off and the DMF is distilled off. The residue is extracted with chloroform, washed with water and dried over anhydrous magnesium sulfate. The chloroform is distilled off and the residue is treated with ether and reprecipitated from methanol-ether. Yield 0.692 part by weight, Rf 1=0.50; m.p. 141°–145° C(decomp.); [$\alpha$]$_D^{24}$ = −44.6°($c$ = 1, methanol).

Analysis for C$_{21}$H$_{31}$O$_6$N$_7$

Calcd. —C, 52.82; H, 6.54; N, 20.53
Found —C, 52.95; H, 6.77; N, 19.65 b. Preparation of Z—Leu—Arg(NO$_2$)—Pro—NHC$_2$H$_5$

In 5 parts by volume of 25 percent HBr-acetic acid is dissolved 0.572 part by weight of Z—Arg(NO$_2$)—Pro—NHC$_2$H$_5$ and the solution is allowed to stand at room temperature for 30 minutes. Then, dry ether is added to the reaction mixture and the resulting precipitate is recovered by filtration and dried. Meanwhile, 0.291 part by weight of Z—Leu—OH is dissolved in 5 parts by volume of dioxane and, under cooling, 0.247 part by weight of DCC and 0.215 part by weight of HONBI are added. The mixture is stirred for 2 hours and the byproduct urea is filtered off. To the filtrate is added the precipitate prepared above, which is dissolved by the addition of 3 parts by volume of DMF. Under cooling, 0.17 part by volume of triethylamine is added dropwise and, then, the mixture is stirred at room temperature overnight. The solvent is distilled off and the residue is extracted with chloroform and washed with water. The chloroform layer is dried over anhydrous magnesium sulfate and the chloroform is distilled off. The residue is treated with ether and reprecipitated from methanol-ether. Yield 0.47 part by weight. (72 percent); m.p. 144°–146° C (decomp.); Rf 1 = 0.40; $[\alpha]_D^{24}$ = –58.0° ($c$ = 1, methanol).

c. In 25 percent HBr-acetic acid is dissolved 0.165 part by weight of Z—Leu—Arg(NO$_2$)—Pro—NHC$_2$H$_5$ and the solution is allowed to stand at room temperature for 30 minutes. Then, dry ether is added to the reaction mixture and the precipitate formed is recovered by filtration and dried well. This precipitate is dissolved in 3 parts by volume of DMF and under cooling and stirring, 0.05 part by volume of N-ethylmorpholine is added dropwise. In this solution is dissolved 0.19 part by volume of H—(Pyr)Glu—His—Trp—Ser—Tyr—Gly—OH—hydrochloride, followed by the addition of 0.054 part by weight of HONBI and 0.062 part by weight of DCC.

The mixture is stirred at 0° C for 2 hours and, then, at room temperature overnight. The byproduct urea is removed by filtration and the DMF is distilled off. The residue is treated with ethyl acetate to obtain powder weighing 0.32 part by weight. This product is applied to a column of Amberlite XAD-2 and desorbed in a linear gradient elution system of a 5 percent aqueous ethanol to ethanol. The principal fraction is lyophilized to obtain 0.11 part by volume of pure H—(Pyr)Glu—His—Trp—Ser—Tyr—Gly—Leu—Arg(NO$_2$)—Pro—NHC$_2$H$_5$. This product is treated with 4 parts by volume of hydrogen fluoride at 0° C for 1 hour in the presence of 0.02 part by volume of anisol and 0.02 part by volume of mercaptoethanol. The hydrogen fluoride is distilled off and, after drying, the residue is dissolved in water. The solution is passed through a column of Amberlite IRA-400(acetate-form) and, then, caused to adsorb on a column of carboxymethyl-cellulose. The column is eluted in a linear gradient elution system of 0.005N-aqueous ammonium acetate to 0.2N-aqueous ammonium acetate and the principal fraction is lyophilized. The procedure yields 0.087 part by weight of pure H–(Pyr)Glu–His–Trp–Ser–Tyr–Gly–Leu–Arg–Pro–NHC$_2$H$_5$. Rf 3 = 0.36; $[\alpha]_D^{24}$ = –56.2°($c$ = 0.5, 5 percent acetic acid)

Amino acid analysis: His, 0.95(1); Arg, 0.98(1); Ser, 0.95(1); Glu, 0.98(1); Pro, 1.00(1); Gly, 1.00(1); Leu, 1.00(1); Tyr, 1.00(1); NH$_2$C$_2$H$_5$, 1.10(1).
Parenthetized figures denote theoretical values.

EXAMPLE 2

Production of H—(Pyr)Glu—His—Trp—Ser—Tyr—Gly—Leu—Arg—Pro—NHC$_2$H$_4$OH a. Preparation of Z—Arg(NO$_2$)—Pro—NHC$_2$H$_4$OH In 5 parts by volume of DMF are dissolved 0.9 part by weight of Z—Arg(NO$_2$)—Pro—OH and 0.43 part by weight of HONBI, and under cooling at 0° C, 0.495 part by weight of DCC is added. The mixture is stirred overnight. The urea compound that has separated out is filtered off and 0.1832 part by weight of ethanolamine is added to the filtrate, followed by stirring overnight. The DMF is distilled off under reduced pressure and dioxane is added to the residue. The insolubles are filtered off. The dioxane is distilled off under reduced pressure and the residue is extracted with n-butanol. The extract is washed with water, dilute hydrochloric acid, water, an aqueous solution of sodium hydrogen carbonate and water in the order mentioned and, then, the n-butanol is distilled off under reduced pressure. The residue is trated with ether and reprecipitated from methanol-ether. Yield 0.625 part by weight (63.3 percent); m.p. 124°–128° C (decomp.); Rf 2 = 0.23; $[\alpha]_D^{20}$ = –36.6° ($c$ = 0.5, ethanol).

b. Preparation of Z—Leu—Arg(NO$_2$)—Pro—NHC$_2$H$_4$OH

In 2 parts by volume of 25 percent HBr-acetic acid is dissolved 0.493 part by weight of Z—Arg(NO$_2$)—Pro—NHC$_2$H$_4$OH and the solution is allowed to stand at room temperature for 30 minutes. Then, dry ether is added and the resulting precipitate is recovered by filtration and dried to obtain powdery product. Meanwhile, 0.282 part by weight of Z—Leu—OH and 0.215 part by weight of HONBI are dissolved in 3 parts by volume of DMF and, under cooling at 0° C, 0.248 part by weight of DCC is added, followed by stirring for 2 hours. To the solution is added the powdery product prepared above and 0.15 part by volume of triethylamine is added dropwise. The mixture is stirred overnight. The urea is filtered off and the DMF is distilled off under reduced pressure. The residue is caused to adsorb on a column of 50 parts by weight of silica gel and desorbed with a solvent system of chloroform-methanol-acetic acid (9:1:0.5). The solvents are distilled off and the residue is crystallized with ether. Yield 0.153 part by weight; m.p. 110°–113° C (decomp.); Rf 1 = 0.49; $[\alpha]_D^{20}$ = –46.6° ($c$ = 0.5, ethanol).

c. In the presence of 0.1 part by volume of anisol, 0.152 part by weight of Z—Leu—Arg(NO$_2$)—Pro—NHC$_2$H$_4$OH is dissolved in 3 parts by volume of hydrogen fluoride. The solution is stirred at 0° C for 1 hour. The hydrogen fluoride is distilled off and the residue is dried well and dissolved in water. After the addition of a small amount of concentrated hydrochloric acid, the solution is washed with ether and the water layer is lyophilized. The resulting powder is dissolved in 5 parts by volume of DMF together with 0.19 part by volume of H—(Pyr)Glu—His—Trp—Ser—Tyr—Gly—OH—hydrochloride and 0.0493 part by weight of HONBI. The solution is cooled to 0° C and 0.0567 part by weight of DCC and 0.07 part by volume of N-ethylmorpholine are added. The entire mixture is stirred overnight. The DMF is distilled off under reduced pressure and the residue is dissolved in water. The insolubles are filtered off and the filtrate is passed through a column of Amberlite IRA-400 (acetate-form). The effluent is collected and lyophilized. This product is applied to a column of Amberlite XAD-2 and desorbed in a linear gradient elution system of water-methanol. The principal fraction is lyophilized to obtain 0.023 part by weight of neat H—(Pyr)Glu—His—Trp—Ser—Tyr—Gly—Leu—Arg—Pro—NHC$_2$H$_4$OH. Rf 3 = 0.28; $[\alpha]_D^{20}$ = −54.4° (c = 0.5, 5 percent aqueous solution of acetic acid). Amino acid analysis: His, 1.00(1); Arg, 1.05(1); Ser, 0.95(1); Glu; 1.00(1); Pro, 1.05(1); Gly, 1.00(1); Leu, 0.95(1); Tyr, 0.76(1). Parenthetized figures denote theoretical values.

EXAMPLE 3

Production of H—(Pyr)Glu—His—Trp—Ser—Tyr—Gly—Leu—Arg—Pro—NHCH$_3$ a. Preparation of Z—Arg(NO$_2$)$_2$)—Pro—NHCH$_3$ In 5 parts by volume of DMF are dissolved 0.675 part by weight of Z—Arg(NO$_2$)—Pro—OH and 0.101 part by weight of methylamine hydrochloride and, while the solution is cooled at 0° C, 0.21 part by volume of triethylamine is added dropwise.

Then, 0.322 part by weight of HONBI and 0.37 part by weight of DCC are added and the entire mixture is stirred at 0° C for 5 hours and, then, at room temperature for 10 hours. The byproduct urea is filtered off and the DMF is distilled off. The residue is extracted with chloroform, washed with water and dried over anhydrous magnesium sulfate. The chloroform is distilled off and the residue is treated with ethanol and reprecipitated from methanol-ether. Yield 0.612 part by weight (88 percent); Rf 1 = 0.30; m.p. 137°–143°C (decomp.); $[\alpha]_D^{24}$ = −41.5° (c = 1, methanol).

Analysis for C$_{20}$H$_{29}$O$_6$N$_7$

Calcd. —C, 51.82; H, 6.31; N, 21.15
Found —C, 51.84; H, 6.54; N, 21.57 b. Preparation of Z—Leu—Arg(NO$_2$)—Pro—NHCH$_3$

In 5 parts by weight of 25 percent HBr-acetic acid is dissolved 0.556 part by weight of Z—Arg(NO$_2$)—Pro—NHCH$_3$ and the solution is allowed to stand at room temperature for 30 minutes. Then, dry ether is added and the resulting crystals are recovered by filtration and dried. Meanwhile, 0.312 part by weight of Z—Leu—OH is dissolved in 5 parts by volume of dioxane-ethyl acetate (1:1) and while the solution is cooled, 0.268 part by weight of DCC and 0.232 part by weight of HONBI are added. The entire mixture is stirred for 2 hours. The byproduct urea is filtered off and the crystals prepared above are added to the filtrate and dissolved by the addition of 3 parts by volume of DMF. Under cooling, 0.17 part by volume of triethylamine is added. The mixture is stirred at room temperature overnight. The solvent is distilled off. The residue is extracted with chloroform and washed with water. The chloroform layer is dehydrated over anhydrous magnesium sulfate and, then, the chloroform is distilled off. The residue is treated with ether and reprecipitated from methanol-ether.

Yield 0.45 part by weight (78 percent); Rf 1 = 0.25.
Analysis for C$_{26}$H$_{40}$O$_7$N$_8$ Calcd. — C, 54.15; H, 7.02; N, 19.43

Found — C, 54.37; H, 6.98; N, 19.52 c. In 5 parts by volume of 25 percent HBr-acetic acid is dissolved 0.144 part by weight of Z—Leu—Arg(NO$_2$)—Pro—NHCH$_3$ and, after the solution is allowed to stand at room temperature for 30 minutes, dry ether is added. The resulting precipitate is recovered by filtration and dried thoroughly. It is then dissolved in 3 parts by volume of DMF and under cooling and stirring, 0.05 part by volume of N-ethylmorpholine is added dropwise.

In this solution is dissolved 0.19 part by weight of H—(Pyr)Glu—His—Trp—Ser—Tyr—Gly—OH—hydrochloride, followed by the addition of 0.054 part by weight of HONBI and 0.062 part by weight of DCC. The entire mixture is stirred at 0° C for 2 hours and, then, at room temperature overnight. The byproduct urea is filtered off and the DMF is distilled off. The residue is applied to a column of Amberlite XAD-2 and desorbed in a linear gradient elution system of 5 percent aqueous ethanol to ethanol. The principal fraction is lyophilized to obtain 0.137 part by weight of pure H—(Pyr)Glu—His—Trp—Ser—Tyr—Gly—Leu—Arg—(NO$_2$)—Pro—NHCH$_3$. A 0.09 part by weight portion of the above product is treated with 4 parts by weight of hydrogen fluoride in the presence of 0.02 part by volume of anisol and 0.02 part by volume of mercaptoethanol at 0° C for 1 hour. The hydrogen fluoride is distilled off and, after drying, the residue is dissolved in water. The solution is passed through Amberlite IRA-400(acetate-form) and, then, caused to adsorb on a column of carboxymethyl-cellulose. The column is eluted in a linear gradient elution system of 0.05N-aqueous ammonium acetate to 0.2N-aqueous ammonium acetate and the principal fraction is lyophilized. The procedure yields 0.06 part by weight of pure H—(Pyr)Glu— His—Trp—Ser—Tyr—Gly—Leu—Arg—Pro—NHCH$_3$.

Rf 3 = 0.37, $[\alpha]_D^{24}$ = −55.6° (c = 0.5 in a 5 percent acetic acid aqueous solution)

Amino acid analysis: His, 0.96(1); Arg, 0.98(1); Ser, 0.96(1); Glu, 1.00(1); Pro, 1.00(1); Gly, 1.00(1); Leu, 0.98(1); Tyr, 0.98(1); NH$_2$CH$_3$, 1.12(1). Parenthetized figures denote theoretical values.

EXAMPLE 4

Production of H—(Pyr)Glu—His—Trp—Ser—Tyr—Gly—Leu—Arg—Pro—Pyrrolidine a. Preparation of IBOC-PRO-Pyrrolidine In 30 parts by volume of acetonitrile, there are dissolved 11.7 parts by weight of IBOC—Pro—OSU and 2.3 parts by volume of pyrrolidine, and the solution is stirred overnight. The acetonitrile is distilled off and the residue is extracted with ethyl acetate. The extract is washed with water and dehydrated over anhydrous sodium sulfate. The ethyl acetate is distilled off and the resulting crystals are recrystallized from ethyl acetatepetroleum benzin. Yield 8.4 parts by volume (80.2 percent). m.p. 84°–84.5° C; $[\alpha]_D^{23}$ = −83.4° (c = 1.0, methanol)

Analysis for C$_{20}$H$_{32}$O$_3$N$_2$

Calcd. —C, 68.93; H, 9.26; N, 8.04
Found —C, 68.93; H, 9.43; N, 8.17 b. Preparation of IBOC—Arg(NO$_2$)—Pro—Pyrrolidine

In 30 parts by volume of trifluoroacetic acid is dissolved 6.96 parts by weight of IBOC—Pro—Pyrrolidine and the solution is allowed to stand at room temperature for 30 minutes. Then, dry ether is added to the solution and the resulting oil is recovered by decantation and dried in a desiccator containing sodium hydroxide. Meanwhile, 7.98 parts by weight of IBOC—Arg(NO$_2$)—OH is dissolved in 40 parts by volume of acetonitrile and, while the solution is cooled at 0° C, 4.0 parts by weight of dinitrophenol and 4.6 parts by weight of DCC are added, followed by stirring for 2 hours. The byproduct urea is filtered off and the oil obtained above is added to the filtrate. The mixture is cooled to 0° C and 2.5 parts by volume of N-ethylmorpholine is added dropwise. The mixture is stirred at room temperature overnight. The acetonitrile is distilled off and the residue is caused to adsorb on 100 parts by weight of silica gel and desorbed with 5 percent aqueous methanol. After this purification procedure, the solvent is distilled off, whereupon 6.0 parts by weight of powder is obtained. Yield 54.5 percent; m.p. 190°–193° C (decomp.); $[\alpha]_D^{23} = -59.7°$ ($c = 1$, methanol)

Analysis for $C_{26}H_{43}O_6N_7$

Calcd. —C, 56.82; H, 7.88; N, 17.84
Found —C, 57.00; H, 8.26; N, 17.51 c. Preparation of IBOC—Leu—Arg(NO$_2$)—Pro—Pyrrolidine

In 30 parts by volume of trifluoracetic acid is dissolved 5.49 parts by weight of IBOC—Arg(NO$_2$)—Pro—Pyrrolidine and the solution is allowed to stand at room temperature for 30 minutes. Then, dry ether is added and the resulting precipitate is recovered by filtration and dried well to obtain powders. Meanwhile, 3.95 parts by weight of IBOc—Leu—OH is dissolved in 20 parts by volume of dioxane. While the solution is cooled at 0° C, 1.52 part by weight of N-hydroxysuccinimide and 2.7 parts by weight of DCC are added and the entire mixture is stirred for 2 hours. The byproduct urea that has separated out is filtered off and the powders prepared above are added to the filtrate, followed by the addition of 10 parts by volume of tetrahydrofuran. The mixture is cooled to 0° C and 1.4 part by volume of triethylamine is added dropwise. The mixture is stirred at room temperature overnight. The solvent is distilled off and the residue is extracted with ethyl acetate. The extract is washed with a 5 percent aqueous solution of sodium hydrogen carbonate and a 10 percent aqueous solution of citric acid. It is then washed with water and dehydrated over anhydrous sodium sulfate. The ethyl acetate is distilled off and the residue is treated with petroleum benzin. It is then reprecipitated from ethyl acetate-petroleum benzin. Yield 5.8 parts by weight; m.p. 185°–6° C (decomp.); $[\alpha]_D^{23} = -53.6°$ ($c = 0.89$, metanol).

Analysis for $C_{32}H_{54}O_7N_8 \cdot H_2O$

Calcd. —C, 56.45; H, 8.29; N, 16.46
Found —C, 56.97; H, 8.17; N, 15.25 d. In 50 parts by volume of methanol is dissolved 0.22 part by weight of IBOC—Leu—Arg(NO$_2$)—Pro—Pyrrolidine and the solution is subjected to hydrogenolysis in the presence of palladium black for 8 hours. The methanol is distilled off and the residue is treated with ether. The resulting powder is dissolved in a mixture of 5 parts by volume of trifluoroacetic acid and 1 part by volume of 2N—HCl—acetic acid and the solution is allowed to stand at room temperature for 40 minutes. The trifluoroacetic acid is distilled off and dry ether is added. The resulting precipitate is recovered by filtration and dried well. This powder (0.153 part by weight) is dissolved in 3 parts by volume of DMF together with 0.24 part by weight of H—(Pyr)Glu—His—Trp—Ser—Tyr—Gly—OH—hydrochloride, followed by the addition of 0.0742 part by weight of DCC, 0.0644 part by weight of HONBI and 0.084 part by volume of N-ethylmorpholine. The mixture is stirred at 0° C for 5 hours and, then, at room temperature overnight. The byproduct urea is filtered off and ethyl acetate is added to the filtrate. The precipitate that has separated out is recovered by filtration, the precipitate weighing 0.26 part by weight. A 0.2 part by weight portion of this product is caused to absorb on a column of Amberlite XAD—2 and desorbed in a linear gradient elution system of 5 percent aqueous ethanol (180 parts by volume) to 50 percent aqueous ethanol. The fractions which give well-defined zones on TLC (silica gel) are collected and lyophilized. The yield is 0.02 part by weight.

$[\alpha]_D^{21} = -91.0°$ ($c = 0.5$, 5 percent actic acid); paper chromatography, Rf = 0.72 ($n$ = butanol-pyridine-acetic acid-water = 30:20:6:24).

Amino acid analysis: His, 1.09(1); Arg, 0.96(1); Ser, 0.82(1); Glu, 1.00(1); Pro, 0.96(1); Gly, 1.00(1); Leu, 1.00(1); Tyr, 0.96(1).

EXAMPLE 5

Production of H—(Pyr)Glu—His—Trp—Ser—Tyr—Gly—NLe—Arg—Pro—NH—CH$_2$CH$_3$ a. Preparation of Z—NLe—Arg(NO$_2$)—Pro—NH—CH$_2$CH$_3$ In 4 parts by volume of 25 percent hydrogen bromide-acetic acid is dissolved 0.4775 part by weight of Z—Arg(NO$_2$)—Pro—NH-CH$_2$CH$_3$ and the solution is allowed to stand at room temperature for 30 minutes. Then, 50 parts by volume of dry ether is added to the reaction mixture and the resulting precipitate is recovered by filtration, washed well with ether and dried over sodium hydroxide under reduced pressure. Meanwhile, 0.2653 part by weight of Z—NLe—OH is dissolved in a mixture of 2 parts by volume of ethyl acetate and 12 parts by volume of dioxane. While the solution is cooled at 0° C, 0.197 part by weight of HONBI and 0.226 part by weight of DCC are added and the entire mixture is stirred for 3 hours. The byproduct urea that has separated out is filtered off and the filtrate is added to a solution of the precipitate obtained above in 1 part by volume of DMF, followed by the dropwise addition of 0.28 part by volume of triethylamine. The mixture is stirred overnight. The solvent is distilled off and the residue is extracted with 100 parts by volume of chloroform. The extract is washed with 5 percent aqueous solution of sodium hydrogen carbonate, water, 0.5 N-hydrochloric acid and water and, then, dehydrated over anhydrous magnesium sulfate. The chloroform is distilled off and the residue is treated with ether and reprecipitated from ethanol-ether. The yield is 0.41 part by weight; m.p. 109°–111° C (decomp.); $[\alpha]_D^{22} = -50.4°$ ($c = 0.5$, EtOH).

Analysis for $C_{27}H_{42}O_7N_8 \cdot \frac{1}{2}H_2O$

Calcd. —C, 54.07; H, 7.22; N, 18.68
Found —C, 53.79; H, 7.09; N, 18.24

In 2 parts by volume of 25 percent hydrogen bromideacetic acid is dissolved 0.155 part by weight of Z—NLe—Arg(NO$_2$)—Pro—NH—CH$_2$CH$_3$ and the solution is allowed to stand at room temperature for 30 minutes. Then, 50 parts by volume of dry ether is added to the reaction mixture and the resulting precipitate is recovered by filtration, washed thoroughly with ether and dried over sodium hydroxide under reduced pressure.

It is then dissolved in 2 parts by volume of DMF and, under cooling at 0° C, 0.19 part by weight of H−(Pyr)-Glu—His—Trp—Ser—Tyr—Gly—OH—hydrochloride, 0.09 part by weight of HONBI, 0.103 part by weight of DCC and 0.1 part by volume of N-ethylmorpholine are added in that order. The mixture is stirred at 0° C for 5 hours and at room temperature for 10 hours. The byproduct urea that has separated out is filtered off and the DMF is distilled off under reduced pressure. The residue is dissolved in 4 parts by volume of 5 percent aqueous ethanol together with 0.2 part by weight of urea and the solution is caused to adsorb on a column of Amberlite XAD-2 and desorbed in a linear gradient elution system of 5 percent aqueous ethanol to 80 percent aqueous ethanol. The principal fraction is lyophilized, whereupon 0.067 part by weight of H—(Pyr)Glu—His—Trp—Ser—Tyr—Gly—NLe—Arg($NO_2$)—Pro—NH—$CH_2CH_3$ is obtained. A 0.060 part by weight portion of this product is dissolved in 4 parts by volume of hydrogen fluoride at −50° C in the presence of 0.05 part by volume of anisol and 0.02 part by volume of 2-mercapto-ethanol and the solution is stirred at 0° C for 1 hour. The hydrogen fluoride is distilled off under reduced pressure and the residue is dried in a desiccator containing sodium hydroxide. The residue is dissolved in 20 parts by volume of water and the solution is passed through Amberlite CG-400(acetateform). The effluent is lyophilized and applied to a column of carboxymethyl-cellulose. It is desorbed in a linear gradient elution system of 0.005 N-ammonium acetate to 0.2 N-ammonium acetate. The principal fraction is lyophilized to obtain 0.035 part by weight of the desired product. This product is further applied to a column of Sephadex LH-20 and desorbed with 0.1 N-acetic acid. The homogeneous fraction is lyophilized, whereupon 0.028 part by weight of pure H—(Pyr)Glu—His—Trp—Ser—Tyr—Gly—NLe—Arg—Pro—NH—$CH_2CH_3$ is obtained. $[\alpha]_D^{25} = -52.2°$ ($c = 0.5$, 5 percent acetic acid).

Amino acid analysis: His, 1.00(1); Arg, 1.02(1); Trp, 1.00(1); Ser, 0.91(1); Glu, 1.00(1); Pro, 1.05(1); Gly, 0.98(1); Tyr, 1.00(1); NLe; 1.02(1).

EXAMPLE 6

Production of H—(Pyr)Glu—His—Trp—Ser—Phe—Gly—Leu—Arg—Pro—NH—$CH_2CH_3$ a. preparation of Z—Ser—Phe—Gly—OEt Z—Phe—Gly—OEt (2.5 parts by weight) is dissolved in methanol (50 parts by volume) and the solution is subjected to catalytic reduction with 5 percent palladium-on-carbon for 4 hours. The catalyst is removed by filtration and the solvent is distilled off. The residue is dissolved in dimethylformamide (20 parts by volume) and, then, Z—Ser ODNP (2.6 parts by weight) is added, followed by stirring for 8 hours. The solvent is distilled off and the residue is dissolved in ethyl acetate. The solvent is washed with a 5 percent aqueous solution of sodium hydrogen carbonate, 1 N-hydrochloric acid and water and, then, dried over magnesium sulfate. The solvent is distilled off and the solid residue is crystallized from ethyl acetate-petroluem benzin. The yield is 1.75 part by weight (74.2 percent); m.p. 128°–129° C; $[\alpha]_D^{22} = -26.2°$ ($c = 0.6$, EtOH)

Analysis for $C_{24}H_{29}O_7N_3$
Calcd. —C, 61.13; H, 6.20; N, 8.91
Found —C, 60.47; H, 6.00; N, 8.88 b. Preparation of Z-Ser-Phe-Gly-$NHNH_2$

Z—Ser—Phe—Gly—OEt(1.65 part by weight) is dissolved in methanol (20 parts by volume) and, then, hydrazin hydrate (0.71 part by volume) is added. The mixture is allowed to stand for 8 hours and the resulting crystals are recovered by filtration and washed with methanol-ether(1:1). The yield is 1.6 part by weight (100 percent); mp. 191°–193° C; $[\alpha_D^{22} = -23.0°$ ($c = 2$, DMF).

Analysis for $C_{22}H_{27}N_5O_6$
Calcd. —C, 57.76; H, 5.95; N, 15.31
Found —C, 57.32; H, 6.21; N, 15.53 c. preparation of Z—Ser—Phe—Gly—Leu—Arg-($NO_2$)—Pro—NH—$CH_2CH_3$

Z—Ser—Phe—$NHNH_2$ (0.8 part by weight) is dissolved in DMF (10 parts by volume) and the solution is cooled. Then, 2N-hydrochloric acid (3.5 parts by volume) is added. Under stirring at −6° C, a 2N-aqueous solution of sodium nitrite is added and the mixture is allowed to react for 10 minutes. Meanwhile, the precipitate is dissolved by the addition of DMF (10 parts by volume). A saturated aqueous solution of sodium chloride is added to the reaction mixture, followed by extraction with ethyl acetate. The extract is pooled with the washings and the solution is washed with a 5 percent aqueous solution of sodium hydrogen carbonate and a saturated aqueous solution of sodium chloride. The ethyl acetate layer (80 parts by volume) is dried over sodium sulfate and, then, added to a solution (20 parts by volume) of H—Leu—Arg($NO_2$)—Pro—NH—$CH_2CH_3$ (1.04 part by weight) in DMF. The ethyl acetate is distilled off in an ice-bath and the resulting homogeneous solution is stirred at 3° C for 2 days. The solvent is distilled off and the residue is purified by chromatography on silica gel. The chromatogram is developed with a solvent system of ethyl acetate-pyridine-acetic acid-water (60:20:6:10) and the active fractions are pooled and distilled to remove the solvents. Water is added to the residue and the resulting solid is recovered by filtration. The yield is 0.87 part by weight (61.2 percent); m.p. 108° C; $[\alpha]_D^{22} = -59.1°$ ($c = 0.7$, EtOH).

Analysis for $C_{41}H_{59}O_{11}N_{11} \cdot H_2O$
Calcd. —C, 54.72; H, 6.83; N, 17.12
Found —C, 54.95; H, 6.84; N, 16.74 d. Z—Ser—Phe—Gly—Leu—Arg($NO_2$)—Pro—NH—$CH_2CH_3$ (0.836 part by weight) is dissolved in methanol and, then, 1N-hydrochloric acid (1 part by volume) is added. The solution is subjected to catalytic reduction with palladium black. The catalyst is removed by filtration and the solvent is distilled off. The residue is dissolved in DMF (10 parts by volume) and, then, H—(-Pyr)Glu—His—Trp—OH (0.83 part by weight) and HONBI(0.36 part by weight) are dissolved. The mixture is cooled to −5° C and, then, DCC(0.412 part by weight) is added. The mixture is allowed to react for 2 days, after which time the precipitate is filtered off and the DMF is distilled off. The residue is purified by chromatography using a column of Amberlite XAD-2 in a linear gradient elution system of 5 percent aqueous ethanol to 80 percent aqueous ethanol. The active fractions are pooled and distilled to remove the ethanol and the residual aqueous solution is lyophilized. The resulting powder is further purified by ion-exchange chromatography on carboxymethyl-cellulose in a linear gradient elution system of 0.005 N to 0.1N-aqueous solution of ammonium acetate. The active fraction is lyophilized to obtain pure white powder. The yield is 0.424 part by weight $[\alpha]_D^{22} = -55°$ ($c = 0.4$, 5 percent acetic acid); Amino acid analysis: His, 1.02(1); Arg, 1.01(1); Trp, 0.91(1); Ser, 0.90(1); Glu, 1.00(1); Pro, 1.00(1); Gly, 0.98(1); Leu, 1.00(1); Phe, 1.00(1); Ethylamine, 1.06(1). To determine the recovery yield of Trp, all the amino acid analysis are carried out by acid hydrolysis with 5.7N-HCl in the presence of thioglycolic acid.

EXAMPLE 7

Production of H—(Pyr)Glu—His—Trp—Ser—Phe—Gly—ILe—Arg—Pro—NHC$_2$H$_5$ a. Preparation of H-(Pyr)Glu-His-Trp-Ser-Phe-Gly-OtBu 1.57 part by weight of H—Gly—OtBu and 4.0 parts by weight of Z—Phe—OSU are dissolved in 20 parts by volume of ethyl acetate, and the mixture is stirred at room temperature overnight. The reaction mixture is washed with a 5 percent solution of sodium hydrogen carbonate, N-hydrochloric acid and water, dehydrated over magnesium sulfate and concentrated under reduced pressure. Petroleum ether is added to the residue, and the precipitate is collected by filtration to obtain 3.5 parts by weight (85 percent) of Z—Phe—Gly—OtBu melting at 78° to 79° C. $[\alpha]_D^{23} = -16.7°$ ($c = 1.0$, EtOH)

Analysis for C$_{23}$H$_{28}$O$_5$N$_2$

Calcd. —C, 66.97; H, 6.87; N, 6.79

Found —C, 67.14; H, 6.64; N, 6.88

7.0 Parts by weight of Z—Phe—Gly—OtBu is dissolved in 50 parts by volume of methanol. The solution is subjected to the catalytic reduction using palladium black as the catalyst, the reduction taking 5 hours. The reaction mixture is filtered, and the filtrate is concentrated by the evaporation of the solvent. The residue is dissolved in 10 parts by volume of acetonitrile, followed by the addition of 1.62 part by weight of Z—Ser—ODNP. The resulting mixture is stirred at room temperature for 1 day, and acetonitrile is evaporated off. The residue is dissolved in ethyl acetate. The solution is washed with a 10 percent ammonia, N-hydrochloric acid and water, dehydrated over anhydrous magnesium sulfate and concentrated by the evaporation of the solvent. The residue is collected by the use of petroleum ether and recrystallized from ethyl acetate-petroleum ether to obtain 1.41 part by weight (70 percent) of Z—Ser—Phe—Gly—OtBu melting at 105° to 106° C. $[\alpha]_D^{23} = -26.6°$ ($c = 0.74$, EtOH)

Analysis for C$_{26}$H$_{33}$O$_7$N$_3$

Calcd —C, 62.50; H, 6.66; N, 8.41

Found —C, 62.91; H, 6.38; N, 812

1.34 Part by weight of Z—Ser—Phe—Gly—OtBu is dissolved in 50 parts by volume of methanol. The solution is subjected to the catalytic reduction using palladium black as the catalyst for five hours. The mixture is filtered, and the filtrate is concentrated to obtain a residue. The residue and 1.27 part by weight of H—(-Pyr)Glu—His—Trp—OH and 0.83 part by weight of HONBI are dissolved in 20 parts by volume of DMF, followed by cooling with ice. To the mixture is added 0.95 part by weight of DCC, and the resulting mixture is allowed to react overnight. The precipitate is removed by filtration, and the filtrate is concentrated. Acetonitrile is added to the residue, followed by heating. Powders in the mixture are collected by filtration and subjected to reprecipitation from 50 percent aqueous ethanol to obtain 1.8 part by weight (87 percent) of H—(Pyr)Glu—His—Trp—Ser—Phe—Gly—OtBu. $[\alpha]_D^{23} = -20.6°$ ($c = 1.0$, DMF).

Analysis for C$_{40}$H$_{49}$O$_9$N$_9$·2H$_2$O

Calcd. —C, 58.59; H, 6.52; N, 15.38

Found —C, 59.02; H, 6.62; N, 15.23 b. Preparation of Z—ILe—Arg(NO$_2$)—Pro—NHC$_2$H$_5$ 1.43 Part by weight of Z—Arg(NO$_2$)—Pro—NHC$_2$H$_5$ is dissolved into 10 parts by volume of 25 percent HBR-acetic acid, and the mixture is allowed to stand at room temperature for 40 minutes. 80 Parts by volume of dried ether is further added, and the precipitate is collected by filtration and dried to obtain powders.

On the other hand, 0.795 part by weight of Z—ILe—OH is dissolved in 10 parts by volume of dioxane, followed by cooling at 0° C. To the solution are added 0.59 part by weight of HONBI and 0.68 part by weight of DCC, and the mixture is stirred for 2 hours. The mixture is filtered to remove precipitate, and to the filtrate is added the above prepared powders. 0.84 Part by volume of triethylamine is further added, and the mixture is stirred at room temperature for 12 hours. The solvent dioxane is removed by evaporation. The residue is dissolved in 100 parts by volume of chloroform. The solution is washed with a 0.1N-hydrochloric acid, a 5 percent aqueous sodium hydrogen carbonate aqueous solution and water, dried over anhydrous magnesium sulfate and concentrated by the evaporation of chloroform. The residue is triturated with ether to obtain precipitate, which is reprecipitated from ethanol-ether to obtain 1.1 part by weight of Z—ILe—Arg(NO$_2$)—Pro—NHC$_2$H$_5$ melting at 103° to 105° C (decomposition). $[\alpha]_D^{23} = -58.1°$ ($c = 1$, MeOH)

Analysis for C$_{27}$H$_{42}$O$_7$N$_8$·½H$_2$O

Calcd. —C, 54.08; H, 7.23; N, 18.68

Found —C, 53.80; H, 7.15; N, 18.84 c. 0.177 Part by weight of Z—ILe—Arg(NO$_2$)—ProNHC$_2$H$_5$ is dissolved in 3 parts by volume of 25 percent HBr-acetic acid, and the solution is allowed to stand at room temperature for 30 minutes, followed by the addition of 50 parts by volume of dried ether. The precipitate is collected by filtration, washed well with ether and dried to obtain an amine component.

On the other hand, 0.221 part by weight of H—(Pyr)-—Glu—His—Trp—Ser—Phe—Gly—OtBu is dissolved into 5 parts by volume of trifluoracetic acid, and the solution is allowed to stand at room temperature for 40 minutes. 0.05 Part by volume of 5.7N-hydrochloric acid is added to the solution, followed by the further addition of 50 parts by volume of ether. The precipitate is collected by filtration, dried and dissolved into 3 parts by volume of DMF, followed by cooling the solution to 0° C. To the solution are added the above prepared amine component, 0.097 part by weight of HONBI, 0.111 part by weight of DCC and 0.126 part by volume of triethylamine. The resulting mixture is stirred at 0° C for 5 hours and then at room temperature for further 10 hours. The mixture is filtered to remove the thus formed dicyclohexyl urea, and the filtrate is concentrated under reduced pressure. The residue is dissolved in 10 parts by volume of a 10 percent aqueous ethanol, and the solution is poured at the top of column packed with Amberlite XAD-2. Desorption is carried out in a linear gradient elution system of 10 percent aqueous ethanol to 80 percent aqueous ethanol. The fractions containing the product are collected, concentrated by the evaporation of the solvent ethanol and lyophillized to obtain 0.085 part by weight of H—(Pyr)Glu—His—Trp—Ser—Phe—Gly—ILe—Arg—($NO_2$)—Pro—$NHC_2H_5$.

0.07 Part by weight of the product is dissolved into a mixture of 0.02 part by volume of anisole, 0.02 part by volume of 2-mercaptoethanol and 4 parts by volume of anhydrous hydrogen fluoride. The solution is stirred at 0° C for 1 hour, followed by evaporating off hydrogen fluoride under reduced pressure. The residue is dried in desiccator, dissolved in 50 parts by volume of water and is passed through a column packed with Amberlite IRA-400 (acetate form). The solution passed through the column is lyophilized to obtain 0.075 part by weight of the crude product. The product is caused to absorb on a column of carboxy methyl-cellulose and desorbed in a linear gradient elution system of 0.005N-ammonium acetate to 0.2N-ammonium acetate. The fractions containing the desired product are lyophilized. The thus obtained product is dissolved into 0.1N-acetic acid aqueous solution and passed through a column of Sephadex LH-20. The solution passed through the column is lyophilized to obtain 0.043 part by weight of pure product. Rf 3 = 0.41; $[\alpha]_D^{23} = -59.4°$ ($c = 0.5$, 5 percent acetic acid), Amino acid analysis; His 1.1(1), Arg 1.1(1), Trp 0.87(1), ethylamine 1.0(1), Ser 0.81(1) Glu 1.03(1), Pro 1.0(1), Gly 1.0(1), ILe 1.06(1), Phe 0.97 (1), the figures in the parenthesis denote theoretical values.

EXAMPLE 8

Production of H—(Pyr)Glu—His—Trp—Ser—Tyr—Gly—Met—Arg—Pro—$NHC_2H_5$ a. Preparation of BOC—Met—Arg—Pro—$NHC_2H_5$ 1.91 Part by weight of Z-Arg($NO_2$)—Pro—$NHC_2H_5$ is dissolved in 10 parts by volume of 25 percent HBr-acetic acid, and the solution is allowed to stand for 30 minutes, followed by the addition of dried ether. The precipitate is collected by filtration, washed well with ether and dried to obtain an amine component.

On the other hand, 1.75 part by weight of BOC—Met—OH.DCHA is dissolved in 100 parts by volume of ether, followed by washing twice with 50 parts by volume of 0.2N aqueous solution of sulfuric acid and drying over anhydrous sodium sulfate. Ether is evaporated off, and the residue is dissolved in 20 parts by volume of dioxane. The solution is cooled to 0° C, and to the solution are added 0.905 part by weight of DCC and 0.79 part by weight of HONBI. The mixture is stirred for 2 hours. The formed dicyclohexyl area is filtered off and the filtrate is concentrated. To the residue are added 5 parts by volume of DMF and all amount of the above prepared amine component. The resulting solution is cooled, followed by the addition of 1.12 part by volume of triethylamine. The mixture is stirred at room temperature for 12 hours and the DMF is evaporated off. The residue is dissolved in 100 parts by volume of chloroform, washed with 0.1N-hydrochloric acid, a 5 percent sodium hydrogen carbonate aqueous solution and water, dried over anhydrous magnesium sulfate and concentrated by the evaporation of chloroform. Ether is added to the residue to obtain solid material. The solid material is reprecipitated from ethyl acetate-ether to obtain 1.4 part by weight of BOC—Met—Arg—Pro—$NHC_2H_5$ melting at 101° to 104° C (decomposition). $[\alpha]_D^{22} = -64.4°$ ($c = 1.0$, MeOH)

Analysis for $C_{23}H_{42}O_7N_8S \cdot \frac{1}{2}H_2O$

Calcd. —C, 47.33; H, 7.42; N, 19.20; S, 5.49
Found —C, 47.67; H, 7.23; N, 18.94; S, 5.48 b. H—(Pyr)Glu—His—Trp—Ser—Tyr—Gly—Met—Arg—Pro—$NHC_2H_5$ 0.275 Part by weight of BOC—Met—Arg($NO_2$)—Pro—$NHC_2H_5$ is dissolved into a mixture of 0.1 part by volume of 2-mercaptoethanol and 5 parts by volume of trifluoracetic acid and allowed to stand at room temperature for 30 minutes. To the mixture is added 0.085 part by volume of 5.7N-hydrochloric acid.

The resulting mixture is cooled and to the mixture is added 50 parts by volume of ether. The precipitate is collected by filtration, washed with ether, dried, dissolved in DMF and cooled to 0° C. To the solution are added 0.318 part by weight of H—(Pyr)Glu—His—Trp—Ser—Tyr—Gly—OH—hydrochloride, 0.107 part by weight of HONBI, 0.124 part by weight of DCC and 0.17 part by volume of N-ethylmorpholine, and the resulting mixture is stirred for 12 hours. The precipitated dicyclohexyl urea is removed by filtration, and the filtrate is concentrated under reduced pressure. The residue is dissolved in 5 parts by volume of 5 percent aqueous ethanol, applied to a column of Amberlite XAD-2 and desorbed in a linear gradient elution system of 5 percent aqueous ethanol to 80 percent aqueous ethanol. The main fractions are lyophilized and dried to obtain 0.135 part by weight of H—(Pyr)Glu—His—Trp—Ser—Tyr—Gly—Met—Arg($NO_2$)—Pro—$NHC_2H_5$.

0.1 Part by weight of the product is dissolved in a mixture of 0.02 part by volume of anisole, 0.02 part by volume of ethanol and 0.02 part by volume of 2-mercaptoethanol and 6 parts by volume of hydrogen fluoride, and the mixture is stirred at 0° C for 1 hour. Hydrogen fluoride is removed by evaporation under reduced pressure and the residue is dried in a desiccator. The residue is dissolved in 20 parts by volume of water and is passed through a column of Amberlite CG-400 (acetate form). The solution passed through the column is lyophilized. The residue is dissolved in 20 parts by volume of water, and to the residue is added 0.4 part by volume of thioglycolic acid. The mixture is allowed to stand at 60° C for 10 hours. The reaction mixture is diluted with 50 parts by volume of water, adsorbed on a column of carboxy methyl-cellulose and desorbed in a linear gradient elution system of 0.005N-ammonium acetate to 0.2N-ammonium acetate. The main fractions are lyophilized to obtain 0.02 part by weight of crude desired product. The product is caused to be adsorbed on a column of Sephadex LH-20 and eluted with 0.1N-acetic acid. The eluted solution is lyophilized to obtain the purified product. TLC: Rf = 0.31(silica gel; n-butanol:acetic acid:ethyl acetate:water = 1:1:1:1) $[\alpha]_D^{23} = -43.2°$($c = 0.25$, 5 percent acetic acid) Amino acid analysis: His 0.9(1), Arg 0.9(1), Trp 0.8(1), Ser 0.7(1), Glu 0.9(1), Pro 1.1(1), Gly 1.0(1), Met 0.9(1), Tyr 0.7(1), ethylamine 0.9(1). The figures in the parentheses denote theoretical values.

EXPERIMENT

The nonapeptide amide derivatives of the present invention were administered to the diestrous rats by the subcutaneous route, and their ovulation inducing activities were determined.

Table

Ovulation inducing activities in the diestrous rats.

| $A_1$ | $A_2$ | Y | $ED_{50}$(ng/100g. body weight) |
|---|---|---|---|
| Tyr | Leu | $NH-CH_3$ | 165.0 |
| Tyr | Leu | $NH-CH_2-CH_3$ | 32.0 |
| Tyr | Leu | $NH-CH_2-CH_2-CH_3$ | 56.0 |
| Tyr | Leu | $NH-CH_2-CH_2-OH$ | 170.0 |
| Tyr | Leu | $NH-CH(CH_3)_2$ | 76.0 |
| Tyr | Nle | $NH-CH_2-CH_3$ | 53.6 |
| Tyr | Met | $NH-CH_2-CH_3$ | 35.0 |
| Phe | Leu | $NH-CH_2-CH_3$ | 84.0 |
| Phe | ILe | $NH-CH_2-CH_3$ | 115.0 |
| Tyr natural decapeptide | Leu | $Gly-NH_2$ | $215 \pm 12$ ng. |

What is claimed is:

1. A nonapeptide amide derivative shown by the general formula:
   L-pyroglutamyl-L-histidyl-L-tryptophyl-L-seryl-$A_1$-glycyl-$A_2$-L-arginyl-L-proyl-Y
wherein $A_1$ is L-tyrosyl or L-phenylalanyl; $A_2$ is L-leucyl, L-isoleucyl, L-norleucyl, L-valyl, L-norvalyl, L-methionyl or L-phenylalanyl, Y represents NHR in which R is a straight or branched alkyl group of one to three carbon atoms which may be substituted by hydroxy or alternatively Y represents pyrrolidino, and pharmaceutically acceptable salt thereof.

2. A nonapeptide amide derivative as claimed in claim 1, wherein $A_1$ is L-tyrosyl, $A_2$ is L-leucyl and Y is $NHCH_2CH_3$.

3. A nonapeptide amide derivative as claimed in claim 1, wherein $A_1$ is L-tyrosyl, $A_2$ is L-leucyl and Y is $NHCH_2CH_2OH$.

4. A nonapeptide amide derivative as claimed in claim 1, wherein $A_1$ is L-tyrosyl, $A_2$ is L-leucyl and Y is $NHCH_3$.

5. A nonapeptide amide derivative as claimed in claim 1, wherein $A_1$ is L-phenylalanyl, $A_2$ is L-isoleucyl and Y is $NHCH_2CH_3$.

6. A nonapeptide amide derivative as claimed in claim 1, wherein $A_1$ is L-tyrosyl, $A_2$ is L-leucyl and Y is pyrrolidino.

7. A nonapeptide amide derivative as claimed in claim 1, wherein $A_1$ is L-tyrosyl, $A_2$ is L-leucyl and Y is $N(CH_3)_2$.

8. A nonapeptide amide derivative as claimed in claim 1, wherein $A_1$ is L-tyrosyl, $A_2$ is L-leucyl and Y is $NHCH(CH_3)_2$.

9. A nonapeptide amide derivative as claimed in claim 1, wherein $A_1$ is L-tyrosyl, $A_2$ is L-norleucyl and Y is $NHCH_2CH_3$.

10. A nonapeptide amide derivative as claimed in claim 1, wherein $A_1$ is L-tyrosyl, $A_2$ is L-methionyl and Y is $NHCH_2CH_3$.

11. A nonapeptide amide derivative as claimed in claim 1, wherein $A_1$ is L-phenylalanyl, $A_2$ is L-leucyl and Y is $NHCH_2CH_3$.

12. A nonapeptide amide derivative as claimed in claim 1, wherein $A_1$ is L-tyrosyl, $A_2$ is L-leucyl.

13. A nonapeptide derivative as claimed in claim 1 wherein Y represents NHR.

* * * * *